MULTIFREQUENCY SIGNAL RECEIVER

Filed Oct. 24, 1963 2 Sheets-Sheet 1

INVENTORS.
THOMAS H. BENNETT
RONALD F. KOWALIK
BY
ATTY.

INVENTORS.
THOMAS H. BENNETT
RONALD F. KOWALIK
BY [signature]
ATTY.

3,288,940
MULTIFREQUENCY SIGNAL RECEIVER

Thomas H. Bennett, Villa Park, and Ronald F. Kowalik, Lombard, Ill., assignors to Automatic Electric Laboratories, Inc., Northlake, Ill., a corporation of Delaware Filed Oct. 24, 1963, Ser. No. 318,576
12 Claims. (Cl. 179—84)

This invention relates to multifrequency signaling systems and more particularly to an arrangement for preventing signal simulation in multifrequency signal receivers.

Multifrequency signaling is becoming more popular in telephone systems and provides advantages over the well known interrupted direct current signaling. One of these advantages is that push button dialing subsets may be offered to the subscriber for speed and reliability in dialing. One signaling system of the multifrequency type is described by L. A. Meacham and L. Schenker in their U.S. Patent 3,076,059. A similar system is described by R. N. Battista, C. G. Morrison and D. H. Nash in their conference paper entitled "Signaling System and Receiver for 'Touch-Tone' Calling," paper No. CP 62–226, published by the American Institute of Electrical Engineers, January 1962. Each of the above references describes a signaling system in which multifrequency signal pulses, hereinafter called bursts, comprising one of a high group of frequencies and one of a low group of frequencies are generated at a telephone substation, transmitted over the voice frequency transmission medium and sensed by a signal receiver. The signal receiver separates the component frequencies of the signal bursts and provides corresponding direct current indications to register apparatus. The system described in the above conference paper also includes apparatus for timing a minimum signal duration before allowing the signals to be registered. This prevents false indication of a digit due to voice frequency signals in the transmission network such as noise. At the end of this predetermined interval the signal detecting apparatus is operated for an output interval by an output timer for read out by the register. If the valid signal is present after read out, the detecting apparatus is held operated until the signal disappears. The receiver is then reset for detecting the next digit.

The problem of noise is not limited however to the time interval just described. For example, if a subscriber should hold a push button down and transmit a valid signal for a period that is longer in time than the sum of the predetermined time interval and the read out interval, and this valid signal includes a noise break therein after the read out interval, it is possible that this one signal may be interpreted by the receiver as two identical valid signals. Assuming that the digit six had been dialed and the signal representing that digit was present at the receiver for a period in excess of the sum of the predetermined time interval and the read out interval, a noise break occurring after the read out interval would cause the receiver to register the digit six-six instead of the correct digit, a single six.

The present invention provides a signal timing arrangement which substantially prevents digit simulation due to noise breaks in a signal already determined to be a valid signal.

It is the object of the invention to provide an improved multifrequency signaling system.

Another object of the invention is to provide an improved multifrequency signal receiver.

A more particular object of the invention is to provide a new and improved signal timing arrangement for substantially preventing digit simulation due to incoming noise or due to noise breaks in valid signals.

The objects and features of the invention not specifically set forth will become apparent and the invention will be best understood from the following description taken in conjunction with the accompanying drawings.

Figure 1:
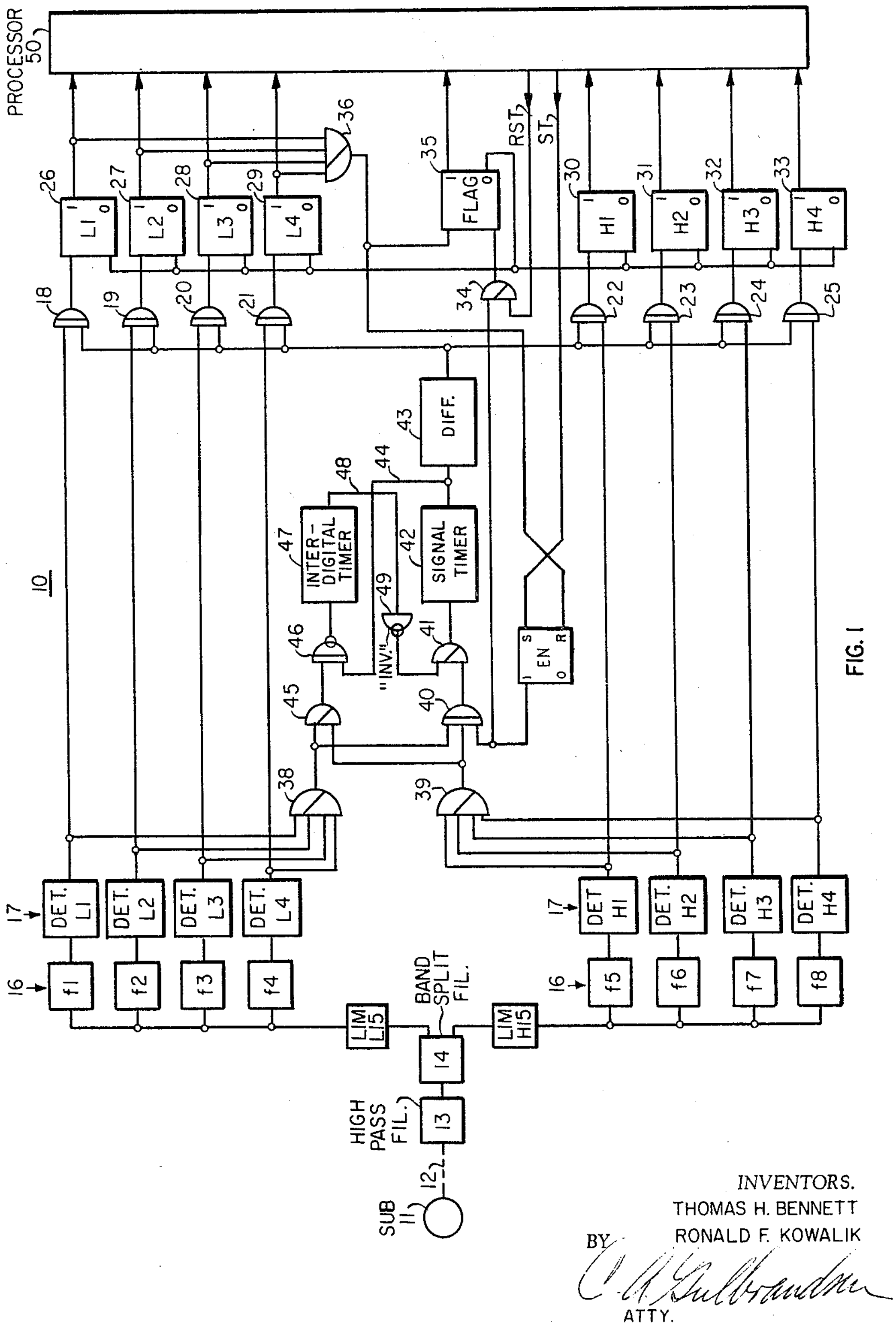
FIG. 1 is a schematic representation of an embodiment of the invention shown in the environment of a telephone system.

Referring to FIG. 1, a receiver 10 is shown connected to a subscriber subset 11 by way of a transmission medium 12. Included in the receiver 10 is a high pass filter 13, a band splitting filter 14, high group and low group limiters H15 and L15, channel filters 16, detector circuits 17, register flip-flops 26–33, and register control gates 18–25. The output of the register flip-flops is connected to a processor 50 which reads the output indications, analyzes the information therein, and utilizes the information to complete the telephone call. Elements 34–39 control the timing of the signals, timing the interdigital pause, and resetting the registers as will be explained in detail below.

Figure 2:
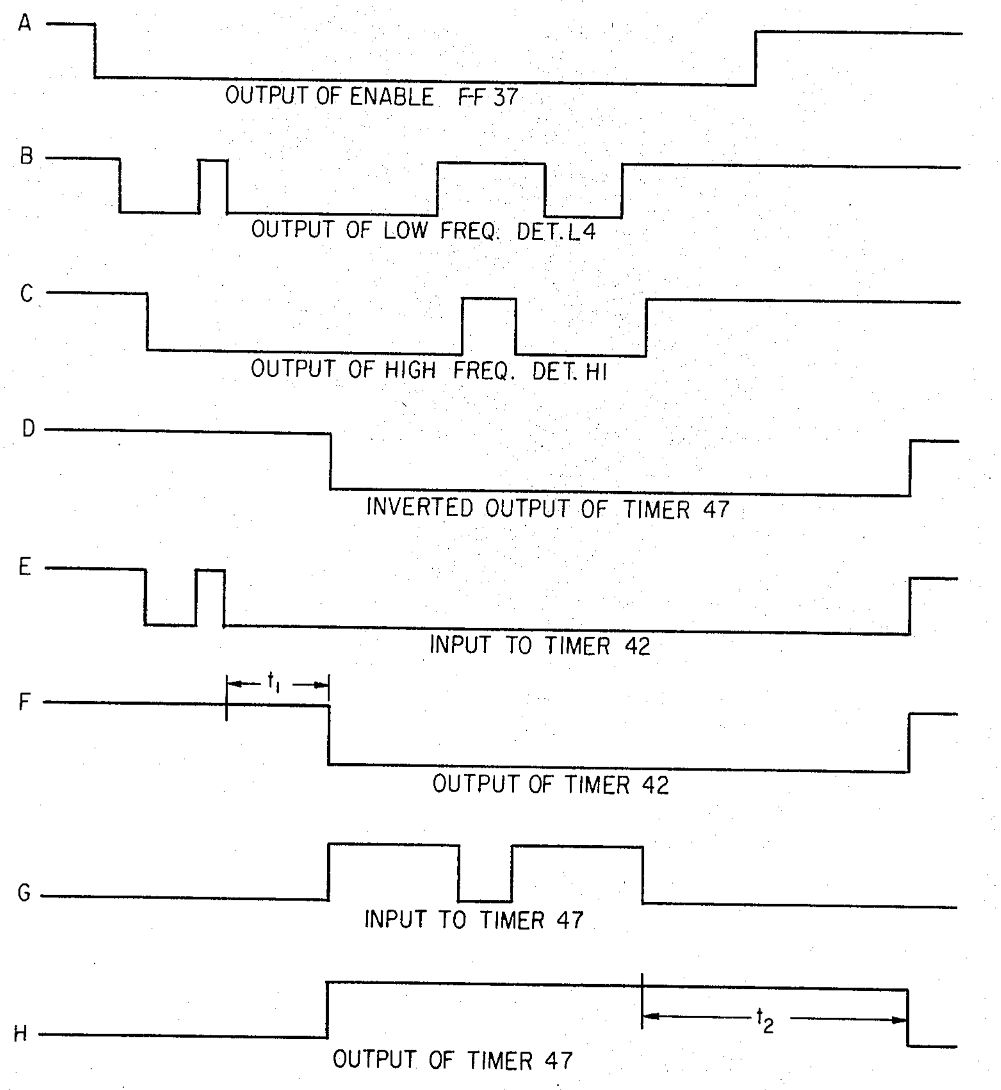
FIG. 2 is a timing chart to aid in understanding FIG. 1.

Referring to FIG. 2, a timing chart is presented to show how the timing arrangement rejects noise as a valid signal and also rejects noise breaks as interdigital pauses. Traces B and C illustrate the output of detectors L4 and H1 in response to the associated channel filters 16. It should be noted that there is no output of timer 42 (trace F) until the AND function, according to traces A, B and C has been presented as an input to timer 42 for a period of at least $t_1$ (the traces E and F). It should also be noted that an output of timer 42 provides a substantially immediate response in the outputs of timer 47 (traces F, G and H). Reference to the timing chart of FIG. 2 will prove valuable in the following operational description of the timing arrangement.

Referring to FIG. 1, assume that the receiver 10 is receiving multifrequency signal bursts from the substation 11 and that these signals are being filtered and divided into groups by the high pass and band splitting filters 13 and 14, respectively. These signals are further acknowledged by the limiters H15, L15 and separated into the individual component frequencies by the channel filters 16, in a manner similar to that described in the foregoing references.

By way of illustration, the two frequencies chosen to indicate a digit ($f4$, $f5$) are those which will enable the low group detector L4 and the high group detector H1. Upon seizure of the equipment the processor 50 conditions the EN flip-flop 37 by way of connection ST, providing one of the inputs to gate 40. When frequencies $f4$, $f5$ are received, the output of detector L4 is extended to an input of OR gate 38 and enables that gate to provide an input to OR gate 45 and AND gate 40. In a similar manner an output from detector H1 is extended to OR gate 39 and enables that gate to provide a second input to OR gate 45 and another input to AND gate 40. Detectors L4 and H1 also furnish at their outputs an input to gates 21 and 22, respectively. AND gate 40, now having the required number of inputs, is enabled and in turn enables OR gate 41 to start signal timer 42. At the end of a predetermined timing interval, timer 42 provides an output to AND gate 46 and to the differentiator circuit 43. This output is a step voltage and is differentiated by circuit 43 and applied to the inputs of AND gates 21 and 22. These two gate circuits, now having sufficient input marks, are enabled and set flip-flops 29 and 30 to indicate an output to the signal processor 50.

When signal timer 42 supplied its step output to the differentiator circuit 43 it also supplied an output by way of connection 44 to an input of AND gate 46. Sufficient inputs now being available, AND gate 46 is enabled to operate the interdigital timer circuit 47. It should be noted that the interdigital timer 47 does not start timing at this instant but furnishes an output by way of connection 48 and inverter 49 to an input of OR gate 41 to sustain signal timer 42 in its timed out condition.

OR gate 36, having an input from each of the low group register flip-flops, is enabled upon read out to enable the flag flip-flop 35. OR gate 36 also resets EN flip-flop 37, which in turn disables AND gate 40 and removes the original starting signal to signal timer 42. Signal timer 42 however, is maintained in the timed out state by interdigital timer 47. During this time, processor 50 has notified by flag flip-flop 35 that information is available to be read. During the holding time or timer 47 the processor may analyze the information in the registers and determine if another digit is required. If another digit is not required the processor will mark connection RST to enable OR gate 34 and reset flip-flop 35 which in turn resets flip-flops 29 and 30 and the next setting of EN flip-flop is upon trunk seizure. If however another digit is required, the processor will mark connection ST to set the EN flip-flop 37, which in turn provides an input to AND gate 40 and to OR gate 34. OR gate 34 will also operate by this input to reset the registers.

When OR gate 38 and OR gate 39 no longer have an input available, that is at the end of a signal, they are disabled, and in turn disable OR gate 45 and AND gate 40. When OR gate 45 is disabled, an input is removed from AND gate 46, which in turn is disabled to start the timing sequence of the interdigital timer 47. At the end of the time interval of timer 47, its output is removed from connection 48 and therefore from OR gate 41, which is disabled, and which in turn resets timer 42. The receiver is now ready to receive the next digit.

It should be noted that interdigital timer 47 is operated to maintain signal timer 42 in its timed outstate and does not start timing the interdigital interval until the signal has disappeared.

If the inputs to both gates 38 and 39 is lost for a period of time that is less than the timing interval of timer 47, the timer will reset at the end of that signal loss period and start timing again. This can be seen by referring to traces B, C, G and H of FIG. 2. Traces B and C show that for a period of time, the output of detector L4 is lost, and during that same period the output of detector H1 is also lost. Trace G shows that during these coincident loss periods, the input to timer 47 is lost; and trace H shows that the timer does not time out until a time period ($t_2$) after both signals have been lost. This indicates that the timer 47 resets its time interval after recognizing that the loss of signal was not actually the end of a signal, but a noise break occurring within the signal.

Traces E and F show that timer 42 does not time out for signals of duration less than $t_1$, but resets and times out after reaching an interval of $t_1$.

Changes and modifications in the invention may be made by one skilled in the art without departing from the spirit and scope of the invention and should be included in the appended claims.

What is claimed is:

1. A signal receiver for sensing tone signal bursts, each said burst comprising a plurality of frequency components each from a separate frequency group, said receiver comprising:

means for separating said signal burst into said component frequencies;

means for detecting said frequency components and providing corresponding indications; and means connected to and controlled by the output of said detecting means for timing two predetermined intervals, said timing means determining whether the duration of said signal components exceed said first time interval, thereby to establish the validity of the presence of said components, and additionally determining whether the absence of said components exceeds said second interval thereby to establish the validity of said absence as intersignal intervals.

2. A signal receiver for sensing tone signal bursts, each said burst comprising a plurality of frequency components each from a separate frequency group, said receiver comprising:

means for separating said signal bursts into said component frequencies;

means including sensing means and output means for detecting said frequency components, said sensing means providing corresponding output indications; and means connected to and controlled by said sensing means for timing a first predetermined interval upon the receipt of said components to determine the time length validity of said frequency components and for timing a second predetermined interval upon the loss of said components to determine the validity of said loss as an intersignal interval, said timing means further connected to and controlling said output means.

3. A signal receiver for sensing multifrequency signal bursts each comprising frequencies from a plurality of frequency groups, said receiver including means for separating said signal bursts into their component frequencies, means for detecting said component frequencies, and means for preventing signal burst simulation, said last-mentioned means comprising:

first means connected to and controlled by said detecting means for timing a predetermined signal duration upon receipt of a signal burst;

and second means connected to and controlled by said detecting means for timing a predetermined interval upon the loss of a signal burst.

4. A signal receiver, as claimed in claim 3, and further comprising electrical connections extending from said first to said second timing means whereby said second timing means is further controlled by said first timing means.

5. A signal receiver, as claimed in claim 4, and further comprising electrical connections extending from said second to said first timing means whereby said first timing means is further controlled by said second timing means.

6. A signal receiver, as claimed in claim 5, said signal receiver further comprising means connected to said detecting means and to said first timing means and coincidently controlled thereby to register the information of said signal bursts.

7. A signal receiver for sensing multifrequency signal bursts, said bursts each comprising frequencies from each of a plurality of frequency groups, a plurality of frequency selective means divided into corresponding groups for separating said signal bursts into their component frequencies, a plurality of means each associated with individual ones of said frequency selective means and correspondingly divided into groups for detecting said frequency components, each said detecting means being operated to provide an output indication upon receipt of the corresponding frequency component, means connected to said plurality of detecting means for registering said output indications, and means for preventing signal simulation, said last-mentioned means comprising:

first timing means connected to said plurality of detecting means for timing said frequency components for a first predetermined interval;

second timing means connected to said first timing means for timing the inter-signal interval; and control means interposed between said plurality of detecting means and said first and second timing means for controlling said two timing means.

8. A signal receiver for sensing multifrequency signal bursts, said bursts each comprising frequencies from each of a plurality of frequency groups, a plurality of frequency selective means divided into corresponding groups for separating said signal bursts into their component frequencies, a plurality of means each associated with individual ones of said frequency selective means and correspondingly divided into groups for detecting said frequency components, each said detecting means having an output and each being operated by its corresponding frequency component to provide an output indication, a plurality of means each connected to said output of individual ones of said detecting means for registering said output indications, and means for preventing signal burst simulation, said last-mentioned means comprising:

first timing means for timing the output of said plurality of detector means for a predetermined interval, said first timing means having an input and an output;

first logic means for controlling the operation of said first timing means, said first logic means having a plurality of inputs and an output, said output being connected to said input of said first timing means and said plurality of inputs being individually connected to said plurality of detecting means;

second timing means for timing a predetermined interval between signal bursts, said second timing means having an input and an output, said output being connected to said input of said first timing means;

second logic means having a plurality of inputs connected to said first logic means and an output connected to said second timing means, said output of said first timing means also connected to said input of said second timing means, said second timing means being coincidently controlled by said first timing means and said second logic means.

9. A signal receiver, as claimed in claim 8, and further comprising a plurality of other logic means each interposed between separate ones of said register means and its corresponding detecting means, each said other logic means having a plurality of inputs and an output, said output being connected to said register means, one of said inputs being connected to said output of the associated detecting means, another of said inputs being connected to said output of said first timing means, whereby each said other logic means is coincidently controlled by timing means and its associated detecting means.

10. A signal receiver, as claimed in claim 9, wherein the output of said first timing means is a step from one potential to another potential, and wherein said receiver further comprises means interposed between the output of said first timing means and the input to said plurality of other logic means for differentiating the output of said first timing means.

11. A signal receiver for sensing multifrequency signal bursts, each said burst comprising one frequency from each of a plurality of frequency groups, a plurality of frequency selective means divided into corresponding groups for separating said signal bursts into their component frequencies, a plurality of means each associated with individual ones of said frequency selective means and correspondingly divided into groups for detecting said frequency components, each said detecting means having an output and being operated by its corresponding frequency component to provide an output indication, a plurality of means individual to each said detecting means for registering said output indications, and means for preventing signal burst simulation, said last-mentioned means comprising:

a plurality of first gating means each having a plurality of inputs and a plurality of outputs and each associated with a separate one of said groups, said pluralities of inputs being individually connected to separate ones of said detecting means of the associated group, each said first gating means being operated by any of its associated detecting means;

second gating means having a plurality of inputs and an output, said inputs being individually connected to said outputs of said plurality of said first gating means;

first timing means having a plurality of inputs and an output, one of said inputs being connected to said output of said second gating means, said first timing means being initially operated by said second gating means;

second timing means having a plurality of inputs and an output, said output being connected to another of said inputs of said first timing means; and third gating means having a plurality of inputs and an output, each of said inputs being individually connected to said output of said first gating means and said output being connected to one of said inputs of said second timing means, said third gating means being controlled by said plurality of first gating means, said output of said first timing means being connected to another of said inputs of said second timing means, said second timing means being initially operated by said first timing means and said third gating means and sustained in operation by said first gating means and said third gating means to maintain said first timing means operated during the presence of any of said frequency components.

12. In a telephone system including means for generating multifrequency signal bursts each comprising frequencies from a plurality of frequency groups, a receiver for sensing said signal bursts and providing corresponding output indications, and means for utilizing said output indications, said receiver comprising:

a plurality of frequency selective means divided into corresponding frequency groups for separating said signal bursts into their component frequencies;

a plurality of means correspondingly divided into groups and individually associated with separate ones of said frequency separating means for detecting said component frequencies, each said detecting means having an output and operated in response to its corresponding component frequency to provide an indication of the presence of said corresponding component frequency;

a first timing means having an input and an output, said input connected to said outputs of said detecting means, said first timing means being operated by at least one detecting means of each said group to time a predetermined interval of signal burst duration;

second timing means having an input and an output, said input connected to said outputs of said plurality of detecting means and to said output of said first timing means, said output also connected to said input of said first timing means, said second timing means being operated by said plurality of detecting means and said first timing means and controlled by said plurality of detecting means to maintain said first timing means operated for a second predetermined interval upon the loss of said frequency components; and a plurality of means individually associated with said plurality of detecting means each having an input and an output and each individually connected at its input to said output of the associated detecting means and to said output of said first timing means for registering the output of its associated detecting means under the control of said associated detecting means and said first timing means.

References Cited by the Examiner

UNITED STATES PATENTS

| | | | |
|---|---|---|---|
| 3,035,250 | 5/1962 | Durkee et al. | 340—171 |
| 3,128,349 | 4/1964 | Boesch et al. | 179—84 |

KATHLEEN H. CLAFFY, *Primary Examiner.*

H. ZELLER, *Assistant Examiner.*